United States Patent
Fietzek et al.

(10) Patent No.: US 11,639,555 B2
(45) Date of Patent: May 2, 2023

(54) COMPACT OZONE GENERATOR WITH MULTI-GAP ELECTRODE ASSEMBLY

(71) Applicant: Xylem Europe GmbH, Schaffhausen (CH)

(72) Inventors: Reiner Fietzek, Herford (DE); Nicole Brueggemann, Lage (DE); Ralf Fiekens, Schloß Holte-Stukenbrock (DE); Manfred Salvermoser, Herford (DE)

(73) Assignee: Xylem Europe GmbH, Schaffhausen (CH)

( * ) Notice: Subject to any disclaimer, the term of this patent is extended or adjusted under 35 U.S.C. 154(b) by 0 days.

(21) Appl. No.: 16/965,452

(22) PCT Filed: Jan. 25, 2019

(86) PCT No.: PCT/EP2019/051864
§ 371 (c)(1),
(2) Date: Jul. 28, 2020

(87) PCT Pub. No.: WO2019/145479
PCT Pub. Date: Aug. 1, 2019

(65) Prior Publication Data
US 2021/0054513 A1 Feb. 25, 2021

(30) Foreign Application Priority Data

Jan. 29, 2018 (EP) ..................................... 18153893

(51) Int. Cl.
C25B 1/13 (2006.01)
C25B 9/17 (2021.01)
(Continued)

(52) U.S. Cl.
CPC ................ *C25B 9/17* (2021.01); *C01B 13/11* (2013.01); *C25B 1/13* (2013.01); *C25B 11/02* (2013.01); *H01T 19/00* (2013.01); *C01B 2201/14* (2013.01)

(58) Field of Classification Search
CPC .. C25B 9/17; C25B 1/13; C25B 11/02; C01B 13/11; C01B 2201/14; C01B 13/115;
(Continued)

(56) References Cited

U.S. PATENT DOCUMENTS 1,437,760 A   12/1922  Kuhlenschmidt
5,411,713 A * 5/1995  Iwanaga ................. C01B 13/11
                                                     204/176

(Continued)

FOREIGN PATENT DOCUMENTS

DE   102015002103       8/2016
JP      07187609 A      7/1995
(Continued)

OTHER PUBLICATIONS

International Search Report and Written Opinion for International Application No. PCT/EP2019/051864, dated Feb. 28, 2019, 10 pages.
International Preliminary Report on Patentabiity and Written Opinion for International Application No. PCT/EP2019/051864, dated Aug. 4, 2020, 7 pages.

*Primary Examiner* — Xiuyu Tai
(74) *Attorney, Agent, or Firm* — RatnerPrestia

(57) ABSTRACT

A device for generating ozone from oxygen-containing gas by silent electric discharge. At least two high-voltage electrodes and at least one ground electrode are nested. A discharge gap is defined between each high-voltage electrode and adjacent ground electrode. A dielectric is arranged in each discharge gap. In one embodiment, at least two discharge gaps are traversed by the gas, and a different voltage is applied to each gap according to the individual (Continued)

gap width. In another embodiment, filler material is arranged in an interstice between the high-voltage electrode and the corresponding dielectric, and the same amount of power is applied to each discharge gap.

11 Claims, 4 Drawing Sheets

(51) Int. Cl.
  *C25B 11/02*  (2021.01)
  *C01B 13/11*  (2006.01)
  *H01T 19/00*  (2006.01)

(58) Field of Classification Search
  CPC .......... C01B 2201/22; C01B 2201/32; C01B 2201/64; C01B 2201/72; C01B 2201/90; H01T 19/00; H01T 23/00; B01J 19/08; B01J 19/088; H05K 7/20336
  See application file for complete search history.

(56) References Cited

U.S. PATENT DOCUMENTS

| | | | |
|---|---|---|---|
| 5,932,116 A * | 8/1999 | Matsumoto | H01J 37/32174 219/121.57 |
| 7,744,825 B2 * | 6/2010 | Tabata | H02M 7/48 422/186.15 |
| 10,647,575 B2 | 5/2020 | Fiekens et al. | |
| 2016/0251220 A1 * | 9/2016 | Ramoino | C01B 13/11 422/186.19 |
| 2020/0062592 A1 * | 2/2020 | Fiekens | C01B 13/11 |

FOREIGN PATENT DOCUMENTS

| | | | | |
|---|---|---|---|---|
| JP | 11157808 A | 6/1999 | | |
| WO | 2012072011 A1 | 6/2012 | | |
| WO | WO-2012072011 A * | 6/2012 | ............. | C01B 13/11 |

* cited by examiner

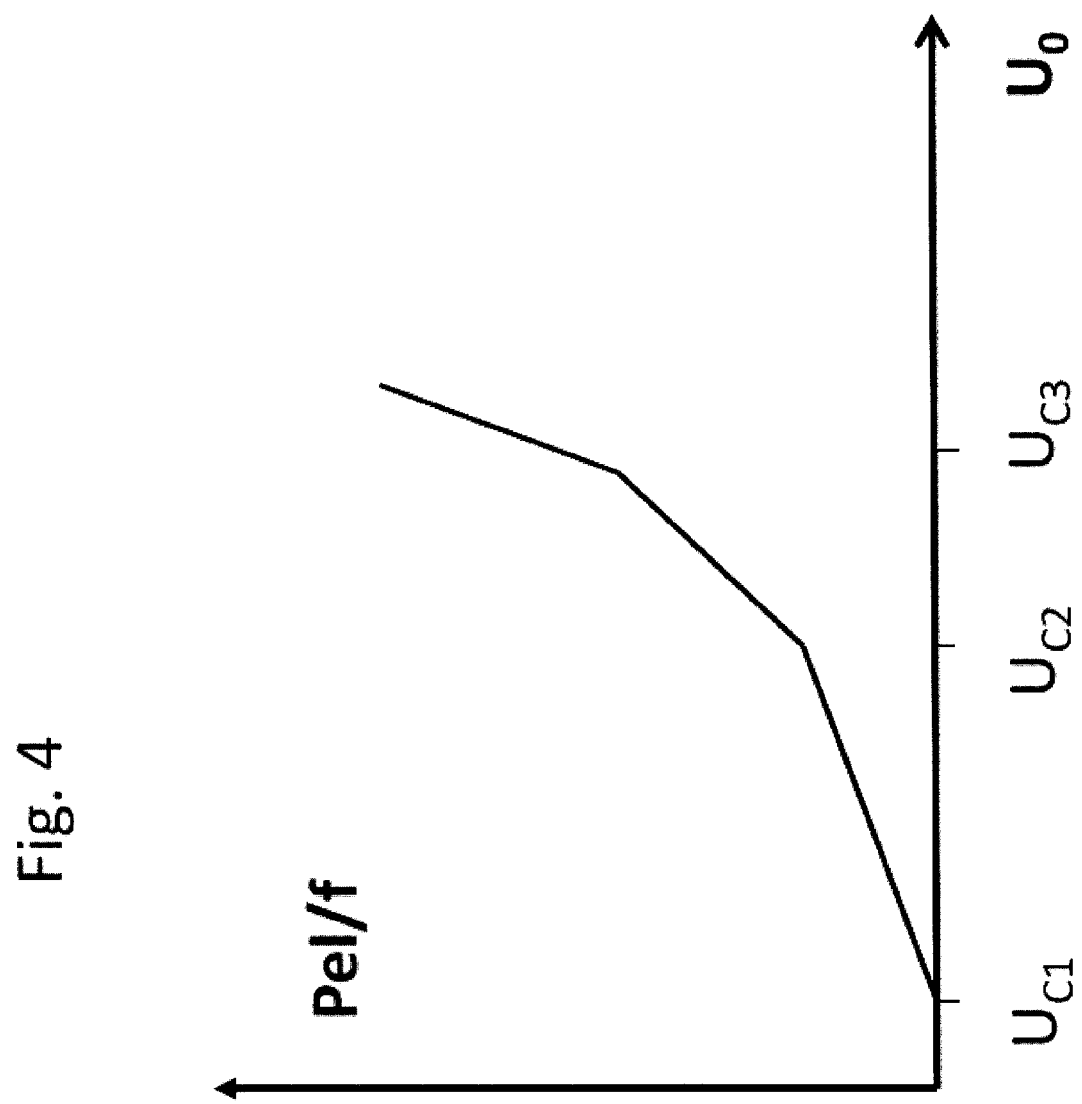

COMPACT OZONE GENERATOR WITH MULTI-GAP ELECTRODE ASSEMBLY

CROSS-REFERENCE TO RELATED APPLICATIONS

This patent application is a U.S. National Phase Patent Application of PCT Application No.: PCT/EP2019/051864, filed Jan. 25, 2019, which claims priority to European Patent Application No. EP18153893.5, filed Jan. 29, 2018, each of which is incorporated by reference herein in its entirety.

The present invention relates to a device for generating ozone with the features of the preamble of claim 1 and a method for ozone production with the features of the preamble of claim 8 and claim 11.

Ozone is a powerful oxidizing medium for organic as well as for inorganic compounds. There are diverse areas of application for ozone, one of which is its use in water treatment.

Technically, ozone can be generated by silent electrical discharge in an oxygen-containing gas. Silent electrical discharge is, in contrast to spark discharge, to be understood as a stable plasma discharge or corona discharge. Molecular oxygen is dissociated into atomic oxygen. The reactive oxygen atoms subsequently attach themselves to molecular oxygen in an exothermic reaction and form tri-atomic molecules, i.e. ozone. The ozone yield depends inter alia on the electric field strength and operating temperature.

Electrode assemblies with multiple discharge gaps for ozone generation are known. They offer several advantages over single gap systems, e.g. better utilization of the reactor volume, lower space requirements, lower investment cost, lower power input and higher discharge areas.

According to Paschen's Law breakdown voltage is a function of gap width times gas density. In order to have uniform power input over multiple discharge gaps, the gaps need to have exactly the same gap width at a given voltage amplitude. However, this is very difficult to realise in ozone generators with concentric tubes leading to losses in performance. Further, differences in number of molecules per cubic centimetre due to differences in temperature can also lead to undesired differences in power input.

It is an objective of the present invention to provide a multiple gap device for generating ozone with reduced specific energy consumption.

This problem is solved by a device for generating ozone with the features listed in claim 1 and a method for ozone production with the features listed in claim 8 and claim 11.

Accordingly, a device for generating ozone from oxygen-containing gas by silent electric discharge with at least two high-voltage electrodes and at least one ground electrode is provided, wherein between each high-voltage electrode and ground electrode a dielectric is arranged, and wherein at least two discharge gaps are formed, which are traversed by the gas, and wherein a different voltage is applied to each single gap according to the individual gap width. By applying a different voltage to each single gap the energy consumption can be reduced because a uniform power input across the gaps can be reached.

Preferably, a transformer with several taps is used to provide different voltages to different gaps.

In another embodiment each gap can have its own power supply to provide different voltages to different gaps.

It is advantageous, if the surface of the electrodes and/or the dielectric is profiled to reach a distribution of gap widths.

Preferably, the gaps are formed between the high-voltage electrodes and the corresponding dielectric.

In a preferred embodiment, the device has an odd number of gaps with an inner ground electrode.

It is preferred that the electrodes and the dielectric are shaped annularly.

Further, a method for ozone production with a device for generating ozone from oxygen-containing gas by silent electric discharge with at least two high-voltage electrodes and at least one ground electrode is provided, wherein between each high-voltage electrode and ground electrode a dielectric is arranged, and wherein at least two discharge gaps are formed, which are traversed by the gas, the method comprising the following steps:

Providing a supply of voltage with a first voltage amplitude to a first high voltage electrode, wherein the first voltage amplitude is higher than a first breakdown voltage of the first gap formed by the first high voltage electrode;

Providing a supply of voltage with a second voltage amplitude to a second high voltage electrode, wherein the second voltage amplitude is higher than a second breakdown voltage of the second gap formed by the second high voltage electrode;

Adjusting the first and second voltage amplitude such that the power input is approximately the same for the first gap and the second gap.

This way the power consumption can be reduced and the performance of ozone generation is increased.

Preferably, a transformer with several taps is used to provide the first and second voltages or each gap has its own power supply to provide different voltages.

A second method for ozone production with a device for generating ozone from oxygen-containing gas by silent electric discharge with at least two high-voltage electrode and at least one ground electrode is further provided, wherein between each high-voltage electrode and ground electrode a dielectric is arranged, and wherein at least two discharge gaps are formed, which are traversed by the gas, the method comprising the following steps:

Adjusting the capacity of at least one gap with filler material arranged in the interstice between a high voltage electrode and a corresponding dielectric, in such a way that the power input is approximately the same for all gaps. Instead of adjusting the voltage amplitudes a filler material can be used to adjust the capacity of the gap to be uniform across the electrode arrangement.

Preferably, the filler material is a wire mesh, which can be made of stainless steel.

It is advantageous, if the device has an odd number of gaps with the inner electrode being a ground electrode.

A single power supply can be used for all high voltage electrodes. Preferably, the high voltage electrodes are connected in parallel to the single power supply.

Preferred embodiments of the present invention will be described with reference to the drawings. In all figures the same reference signs denote the same components or functionally similar components.

FIG. 4 shows a graph with a schematic course of power input versus voltage amplitude of a three-gap ozone generator.

Figure 1:
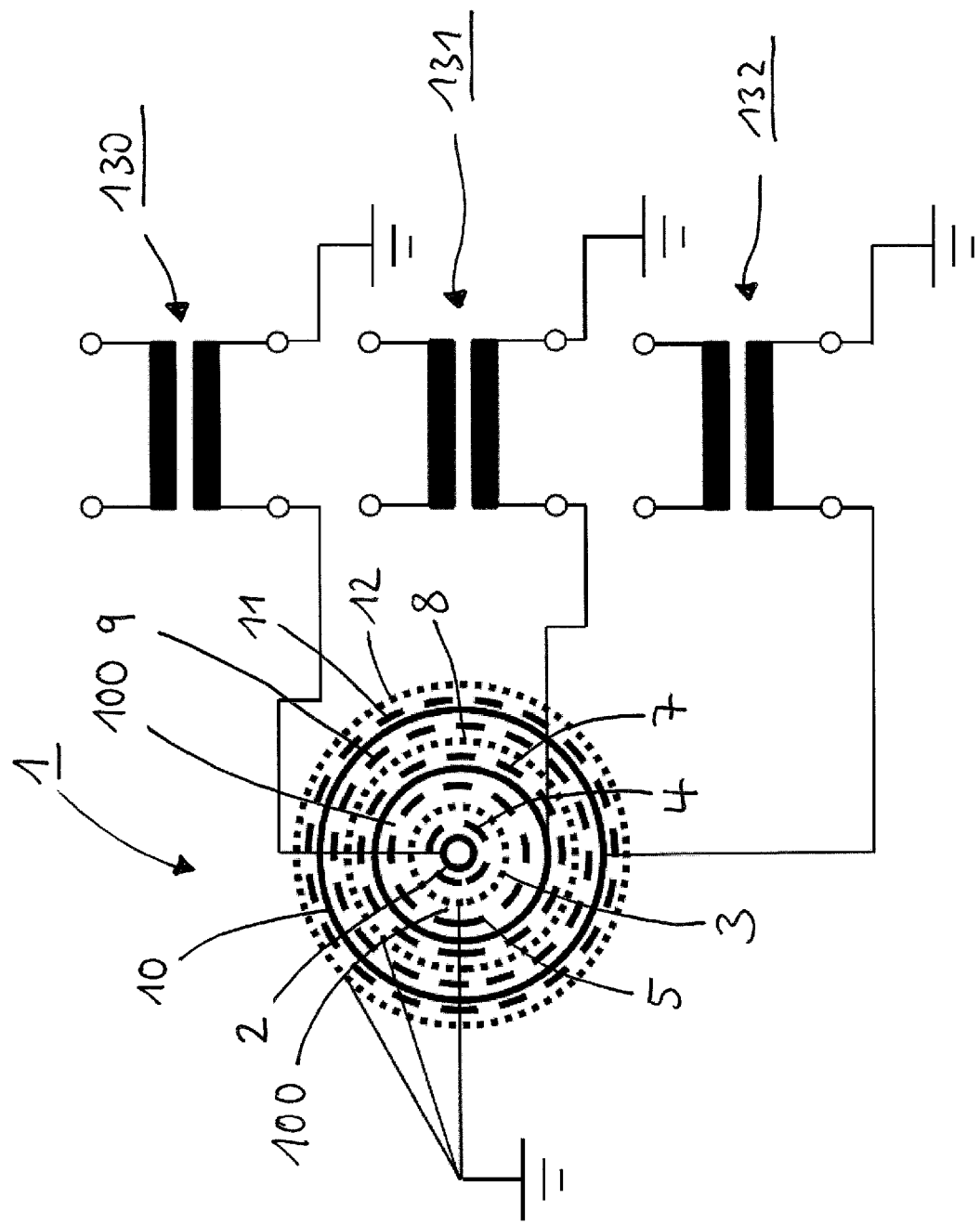
FIG. 1 shows a schematic cross-sectional view of a multi-gap discharge unit of an ozone generator with multiple high-voltage power supplies.

FIG. 1 shows an electrode arrangement 1 of a device for generating ozone with a group of annular shaped electrodes, which are installed in a nesting manner. The components of the electrode arrangement are shown schematically. Dotted or broken lines do not represent any physical structure of the electrodes. High voltage electrodes are represented by a solid line, dielectrics by a broken line and ground electrodes by a dotted line. A central high voltage electrode 2 is concentrically surrounded by a ground electrode 3, wherein in between the electrodes 2, 3 a dielectric 4 is arranged. The inner electrode 2 can be hollow, allowing liquid or gas to flow through the inside of the electrode 2 for cooling purposes. The ground electrode 3 is again surrounded by a dielectric 5, which is covered by a high voltage electrode 6. The high voltage electrode 6 is again surrounded by a dielectric 7 followed by a ground electrode 8, another dielectric 9, an outer high voltage electrode 10 and a dielectric 11 covering the outer high voltage electrode 10. The outermost layer of the electrode arrangement is a ground electrode 12. Gaps 100 are formed both between the high-voltage electrodes and the dielectric and between the dielectric and the ground electrodes. The gaps 100 have different gap widths. Through the gaps 100 pure oxygen or a gaseous mixture, such as atmospheric air containing oxygen is passed. The high-voltage electrodes 2, 6, 10 are each electrically connected to a separate high-voltage power supply 130, 131, 132. If a voltage amplitude above the breakdown voltage is applied, a corona appears in the discharge gap resulting in the partial conversion of oxygen into ozone. Ozone forms when oxygen molecules are accelerated and collide in an alternating electric field. This formation only occurs when there is a voltage gradient and the electric field has reached the necessary strength to ionize the gas.

Ozone production by such generators is an increasing function of the electrical power applied thereto and the control of the production at the required value is, therefore, effected by adjusting said power.

Figure 2:
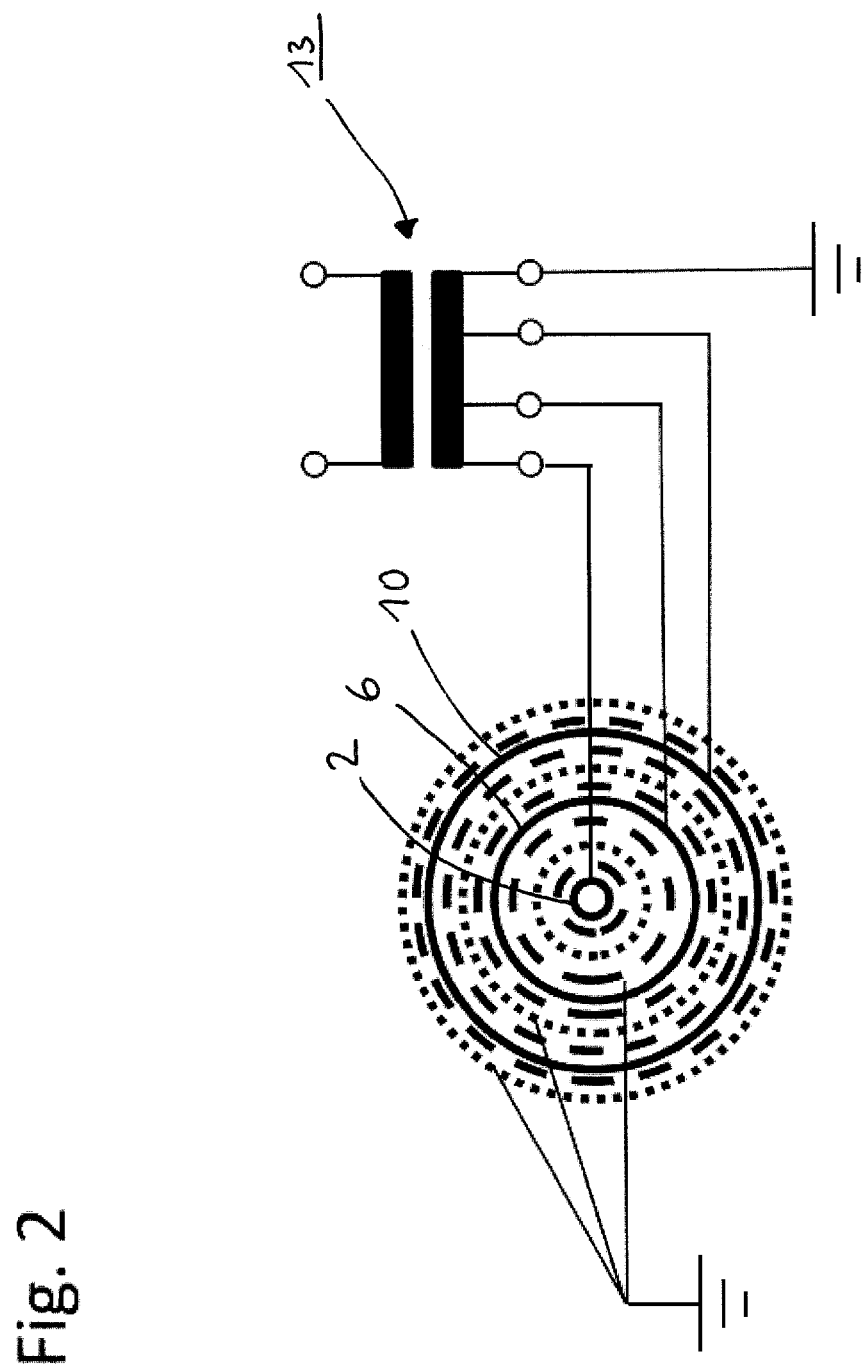
FIG. 2 shows a schematic cross-sectional view of a multi-gap discharge unit of an ozone generator with a single high-voltage power supply.

In FIG. 2 the electrode arrangement of FIG. 1 is shown with exception of the multiple high-voltage power supplies. In contrast to the FIG. 1 a single high-voltage power supply 13 with one high-voltage capacitor is used. The high voltage electrodes 2, 6, 10 are connected in parallel.

Figure 3:
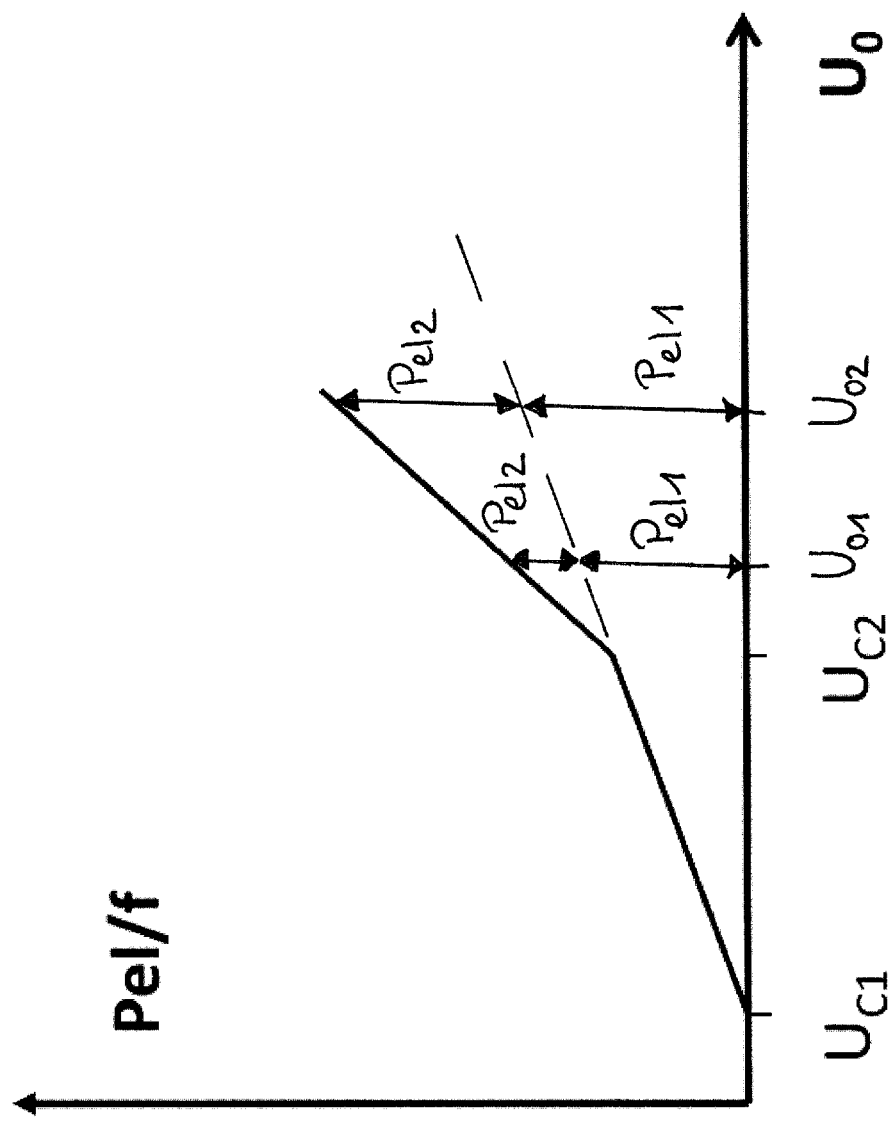
FIG. 3 shows a graph with a schematic course of power input versus voltage amplitude of a two-gap ozone generator.

FIG. 3 shows the dependence of the power input $P_{el}$ of a two-gap ozone generator from the voltage amplitude $U_0$. The two gaps are connected to a single power supply. The two gaps have different breakdown voltages (ignition voltage) $U_{c1}$ and $U_{c2}$ respectively, wherein $U_{c1}<U_{c2}$. At $U_{c1}<U_{c2}$ only the first gap is ignited. If the voltage amplitude reaches $U_{01}$, both gaps are ignited but the power input is not the same. For the power input of the two gaps to be the same, the voltage amplitude needs to be equal to $U_{02}$. However $U_{02}$ is not the optimal voltage for the two gaps in terms of ozone generation efficiency.

FIG. 4 shows the dependence of the power input $P_{el}$ of a three-gap ozone generator from the voltage amplitude $U_0$. As explained above for the two-gap ozone generator, the three gaps have different breakdown voltages $U_{c1}$, $U_{c2}$ and $U_{c3}$ respectively, wherein $U_{c1}<U_{c2}<U_{c3}$. For the power input of the three gaps to be the same, the voltage amplitude is not the optimal voltage for the three gaps in terms of ozone generation efficiency.

In order to reach a uniform power input across all gaps with high ozone production efficiency, e.g. the effective gap width or the applied voltages are adjusted according to the invention.

In one embodiment of the present invention a transformer with several taps is used to provide different voltages to different gaps. The voltages are adjusted according to the gap width, so that the power input for each gap is nearly the same. This way uneven gap widths can be compensated.

In another embodiment each gap has its own power supply 130, 131, 132 to provide different voltages to different gaps (see FIG. 1). Likewise, the voltages are adjusted according to the gap widths.

Instead of adjusting the voltage, in another embodiment the capacity of the gap and the breakdown voltage, respectively, can be modified with filler material. The gap and the dielectric form capacitors connected in series. The filler material is in electrical contact with the electrode. It is made particularly of wire mesh, preferably made of stainless steel. However, netting or a woven fabric, a web-like fabric or an unstructured wire material can be used in simple applications.

The filler material reduces the effective gap width and the capacity of the gap respectively. This way the breakdown voltage of the gap and the power input can be adjusted, so that the power input for each gap with a single power supply is nearly the same.

If the electrodes 2, 6, 10 are connected in series, the voltage can be further adjusted with increasing ozone concentration and a respective change in breakdown voltage.

It can be advantageous to profile the surface of the electrodes or dielectric to reach a distribution of gap widths.

Preferably, the multiple gap system has an odd number of gaps, so that the inner electrode can be a ground electrode.

The invention is not limited to annular shaped electrodes. Plate type electrodes can be used as well.

The invention claimed is:

1. A device for generating ozone from oxygen-containing gas by silent electric discharge, the device comprising:
    two or more high-voltage electrodes and one or more ground electrodes in a nested arrangement defining two or more nested discharge gaps located on a common cross-sectional plane, each nested discharge gap defined between a corresponding nested electrode pair, each corresponding nested electrode pair comprising one of the high-voltage electrodes and an adjacently nested one of the ground electrodes and having a corresponding individual gap width configured to be traversed by the gas;
    two or more dielectrics, including at least one dielectric arranged in each nested discharge gap; and
    at least one power source configured to supply a different voltage to each corresponding nested electrode pair according to the corresponding individual gap width.

2. The device of claim 1, wherein the at least one power source comprises a transformer having a plurality of taps.

3. The device of claim 1, wherein the at least one power source comprises an assigned power supply corresponding to each corresponding discharge gap.

4. The device of claim 1, wherein one or more of: the two or more high-voltage electrodes, the one or more ground electrodes, and the two or more dielectrics, has a surface that is profiled to provide a distribution of individual gap widths.

5. The device of claim 1, wherein each nested discharge gap is defined between one of the two or more high-voltage electrodes and a corresponding dielectric of the two or more dielectrics.

6. The device of claim 1, comprising an odd number of the nested discharge gaps, wherein the one or more ground electrodes includes an inner ground electrode.

7. The device of claim 1, wherein the two or more high-voltage electrodes, the one or more ground electrodes, and the two or more dielectrics each have an annular shape.

8. A method for ozone production, the method comprising the steps of:
   (a) providing the device of claim 1;
   (b) supplying a first voltage with a first voltage amplitude to a first high voltage electrode of the two or more high voltage electrodes, wherein the first voltage amplitude is higher than a first breakdown voltage ($U_{C1}$) of a first discharge gap defined by the corresponding nested electrode pair comprising the first high voltage electrode;
   (c) supplying a second voltage with a second voltage amplitude to a second high voltage electrode of the two or more high voltage electrodes, wherein the second voltage amplitude is higher than a second breakdown voltage ($U_{C2}$) of a second discharge gap defined by the corresponding nested electrode pair comprising the second high voltage electrode;
   (d) adjusting the first voltage amplitude and the second voltage amplitude such that a first power input of the first discharge gap and a second power input of the second input gap are the same; and
   (e) supplying oxygen gas to the two or more nested discharge gaps and generating ozone by silent electric discharge within the each nested discharge gap.

9. The method of claim 8, wherein the step of providing the device comprises providing a transformer having a plurality of taps including at least a first tap and a second tap, wherein the first voltage is supplied from the first tap and the second supply of voltage is provided from the second tap.

10. The method of claim 8, wherein the step of providing the device comprises providing an assigned power supply to each of the two or more nested discharge gaps, wherein the first voltage is supplied from a first assigned power supply and the second voltage is supplied from a second assigned power supply.

11. The device of claim 1, wherein the two or more high-voltage electrodes are concentrically nested.

* * * * *